(12) United States Patent
Mark et al.

(10) Patent No.: US 9,956,521 B2
(45) Date of Patent: May 1, 2018

(54) BLOWER PURGE DRYER WITH COOLING APPARATUS AND METHODOLOGY

(71) Applicant: Ingersoll-Rand Company, Davidson, NC (US)

(72) Inventors: Henry Y. Mark, Philadelphia, PA (US); Janez Jakop, Logatec (SI)

(73) Assignee: Ingersoll-Rand Company, Davidson, NC (US)

( * ) Notice: Subject to any disclaimer, the term of this patent is extended or adjusted under 35 U.S.C. 154(b) by 0 days. days.

(21) Appl. No.: 15/084,857

(22) Filed: Mar. 30, 2016

(65) Prior Publication Data

US 2016/0288048 A1  Oct. 6, 2016

Related U.S. Application Data

(60) Provisional application No. 62/143,006, filed on Apr. 3, 2015.

(51) Int. Cl.
  *B01D 53/04* (2006.01)
  *B01D 53/26* (2006.01)
  (Continued)

(52) U.S. Cl.
  CPC ....... *B01D 53/261* (2013.01); *B01D 53/0438* (2013.01); *B01D 53/0446* (2013.01);
  (Continued)

(58) Field of Classification Search
  CPC ............ B01D 53/0438; B01D 53/0454; B01D 53/0446; B01D 53/047; B01D 53/261;
  (Continued)

(56) References Cited

U.S. PATENT DOCUMENTS 2,699,837 A    1/1955  Van Note
4,552,570 A *  11/1985 Gravatt .............. B01D 53/0407
                                                        95/10
(Continued)

FOREIGN PATENT DOCUMENTS

EP        1163947 A1   12/2001
WO    2015116486 A1    8/2015

OTHER PUBLICATIONS

Extended European Search Report, European Patent Application No. 16162866.4, dated Aug. 10, 2016, 9 pages.

*Primary Examiner* — Frank Lawrence
(74) *Attorney, Agent, or Firm* — Taft Stettinius & Hollister LLP

(57) ABSTRACT

A multi-tower blower purge dryer system for use with a compressed air stream provided from a compressor is disclosed. In one form the system includes two dryers that can be alternated to dry the compressed air stream. The tower used to dry the compressed air stream can be referred to as the drying tower, and the tower being regenerated can be referred to as the regenerated tower. A number of valves and passages are used to connect the towers to one another and/or to an intake passage from the compressor. A blower purge heater is provided to regenerate the dryers. After a regeneration step in which a tower may be relatively warm, the valves can be actuated to place the warm regenerated tower in fluid communication with the intake passage from the compressor, which can then provide air to the drying tower. In this manner the regenerated tower is cooled.

20 Claims, 10 Drawing Sheets

(51) Int. Cl.
*B01D 53/30* (2006.01)
*B01D 53/047* (2006.01)

(52) U.S. Cl.
CPC ......... *B01D 53/0454* (2013.01); *B01D 53/30* (2013.01); *B01D 53/047* (2013.01); *B01D 53/265* (2013.01); *B01D 2257/80* (2013.01); *B01D 2258/06* (2013.01); *B01D 2259/402* (2013.01); *B01D 2259/40003* (2013.01); *B01D 2259/4009* (2013.01); *B01D 2259/40009* (2013.01); *B01D 2259/40086* (2013.01)

(58) Field of Classification Search
CPC .. B01D 53/265; B01D 53/30; B01D 2257/80; B01D 2258/06; B01D 2259/40003; B01D 2259/40009; B01D 2259/40086; B01D 2259/4009; B01D 2259/402
USPC ...... 96/112, 121, 126–128, 131, 146; 95/96, 95/97, 104, 106, 114, 115, 117, 121–125; 34/80, 472, 473
See application file for complete search history.

(56) References Cited

U.S. PATENT DOCUMENTS

| | | | |
|---|---|---|---|
| 5,213,593 A * | 5/1993 | White, Jr. | B01D 53/0462 95/99 |
| 55,933,475 | 1/1997 | Minh | |
| 6,375,722 B1 * | 4/2002 | Henderson | B01D 53/0454 96/112 |
| 7,279,026 B1 * | 10/2007 | Fresch | B01D 53/04 95/124 |
| 7,727,312 B2 * | 6/2010 | Huberland | B01D 53/261 55/DIG. 17 |
| 7,922,790 B2 * | 4/2011 | Vertriest | B01D 53/261 55/DIG. 17 |
| 9,511,321 B2 * | 12/2016 | Hwang | F24F 3/1411 |
| 2014/0223767 A1 * | 8/2014 | Arno | F26B 21/083 34/549 |
| 2014/0360364 A1 * | 12/2014 | Bergh | B01D 53/261 95/41 |
| 2015/0116486 A1 | 4/2015 | Chang et al. | |
| 2015/0290578 A1 * | 10/2015 | Hwang | F24F 3/1411 96/115 |

* cited by examiner

BLOWER PURGE DRYER WITH COOLING APPARATUS AND METHODOLOGY

CROSS REFERENCE TO RELATED APPLICATIONS

The present application claims the benefit of U.S. Provisional Patent Application Ser. No. 62/143,006, filed Apr. 3, 2015, which is incorporated herein by reference in its entirety.

TECHNICAL FIELD

The present invention generally relates to dryer systems for use in compressor flow streams, and more particularly, but not exclusively, to regenerative dryer systems for use in compressor flow streams.

BACKGROUND

Improving the performance of dryer systems for use in compressor flow streams remains an area of interest. Some existing systems have various shortcomings relative to certain applications. Accordingly, there remains a need for further contributions in this area of technology.

BRIEF SUMMARY

One embodiment of the present invention is a unique tower regenerative dryer system for use with a compressor. Other embodiments include apparatuses, systems, devices, hardware, methods, and combinations for regenerating towers used in dryer systems. Further embodiments, forms, features, aspects, benefits, and advantages of the present application shall become apparent from the description and figures provided herewith.

BRIEF DESCRIPTION OF THE DRAWINGS

The description herein makes reference to the accompanying figures wherein like reference numerals refer to like parts throughout the several views.

Figure 1:
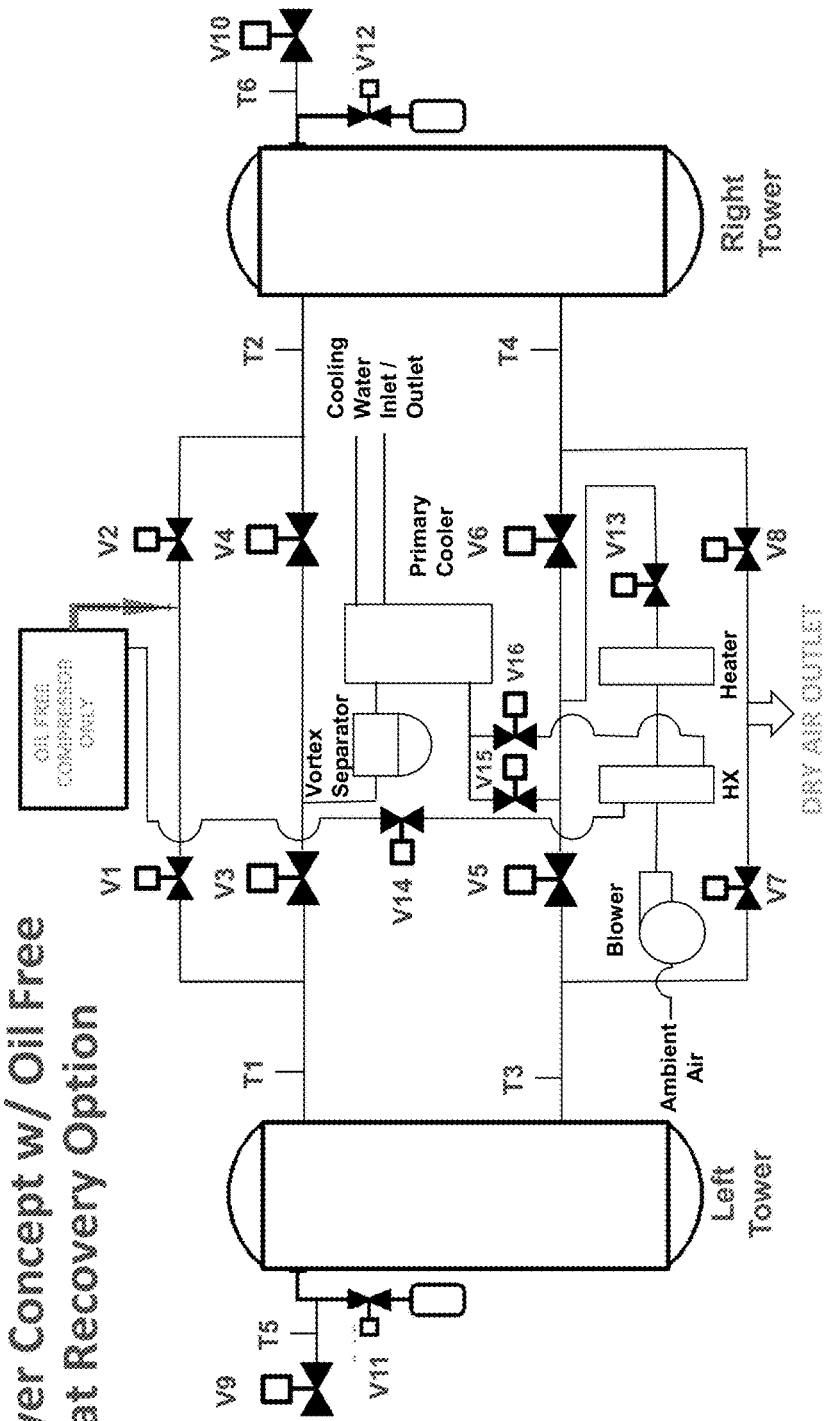
FIG. 1 illustrates components in one embodiment of a tower dryer system.

The foregoing summary, as well as the following detailed description of certain embodiments of the present application, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 2:
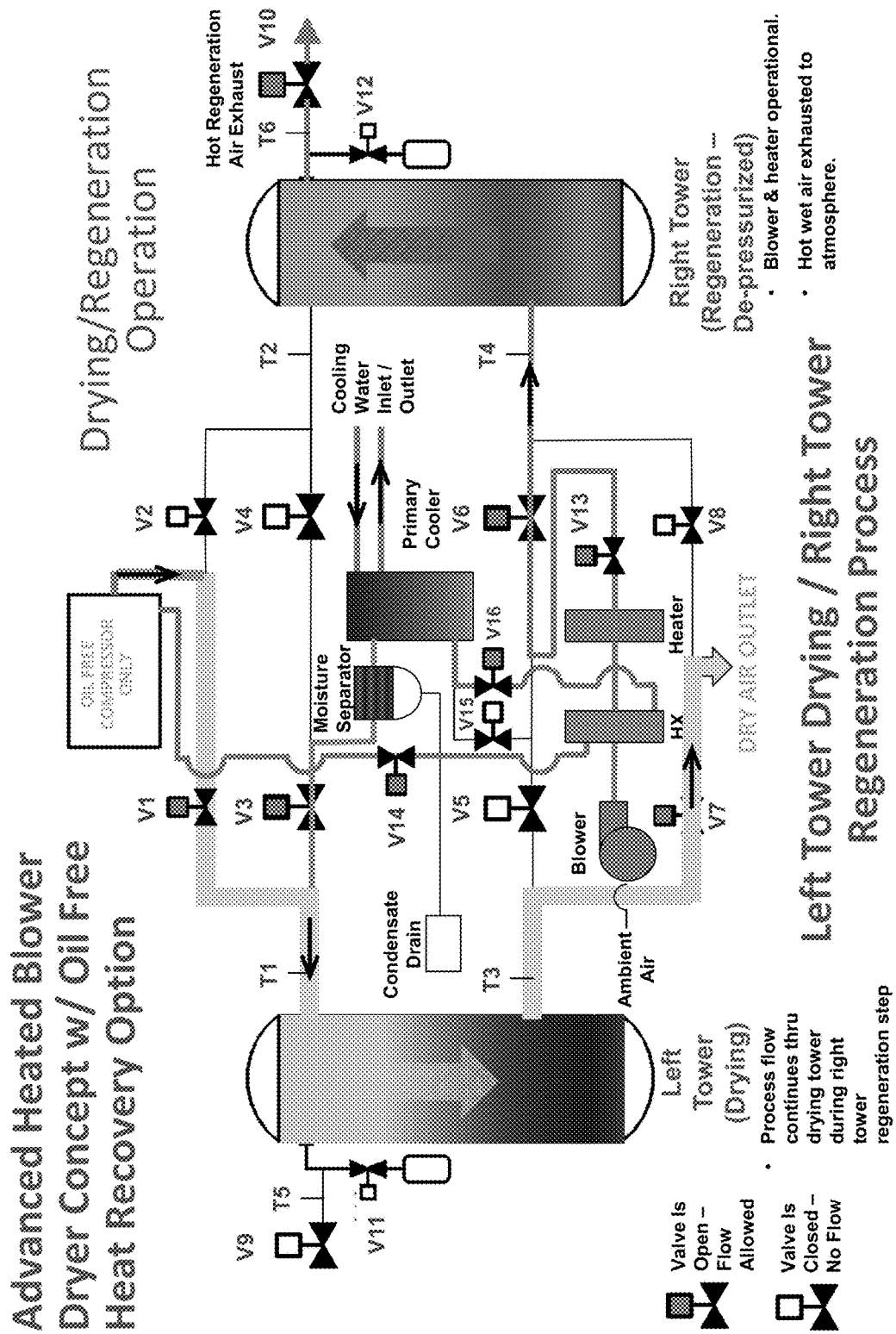
FIG. 2 illustrates one mode of operation of the embodiment depicted in FIG. 1.
Figure 3:
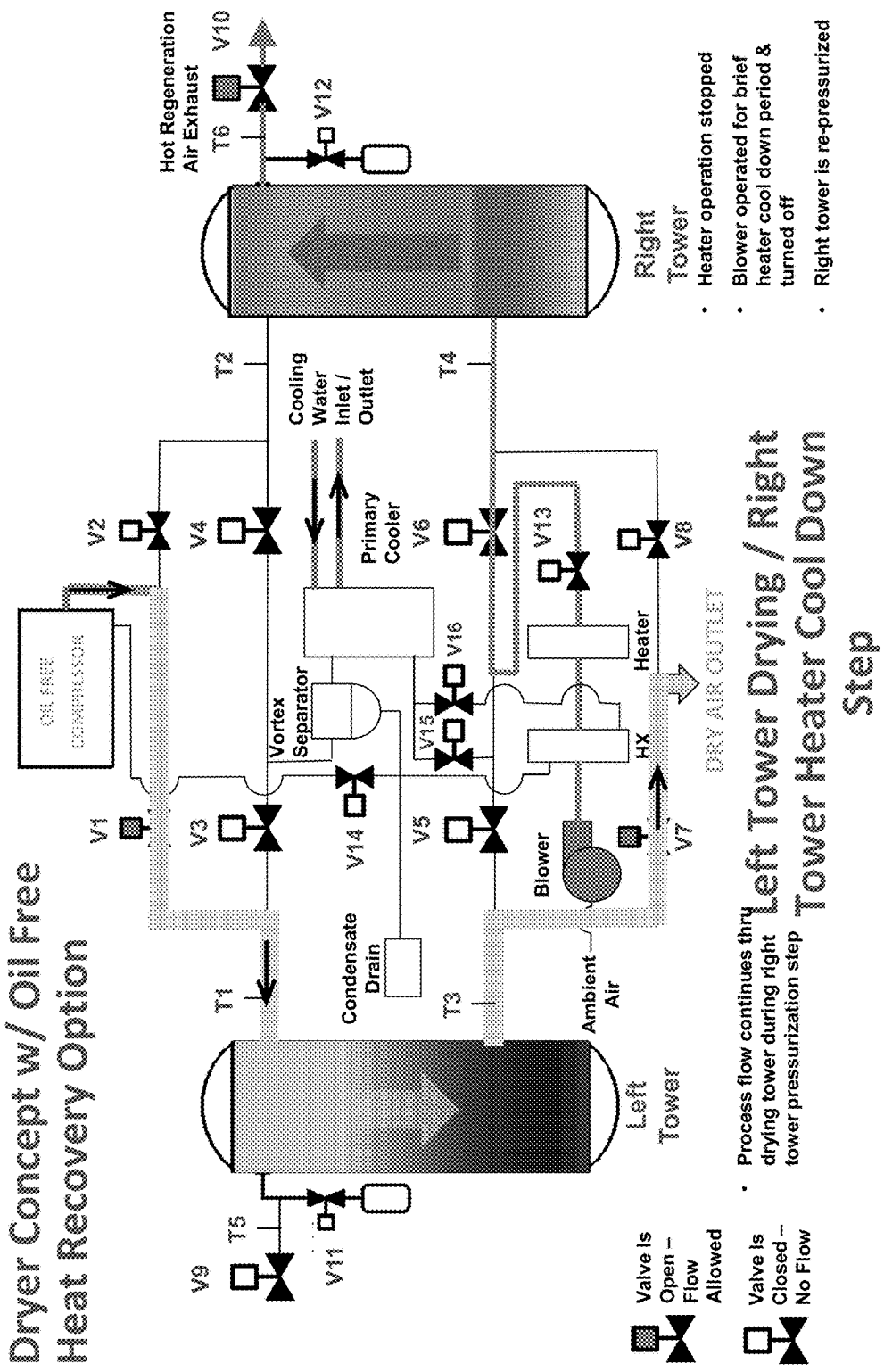
FIG. 3 illustrates another mode of operation of the embodiment depicted in FIG. 1.
Figure 4:
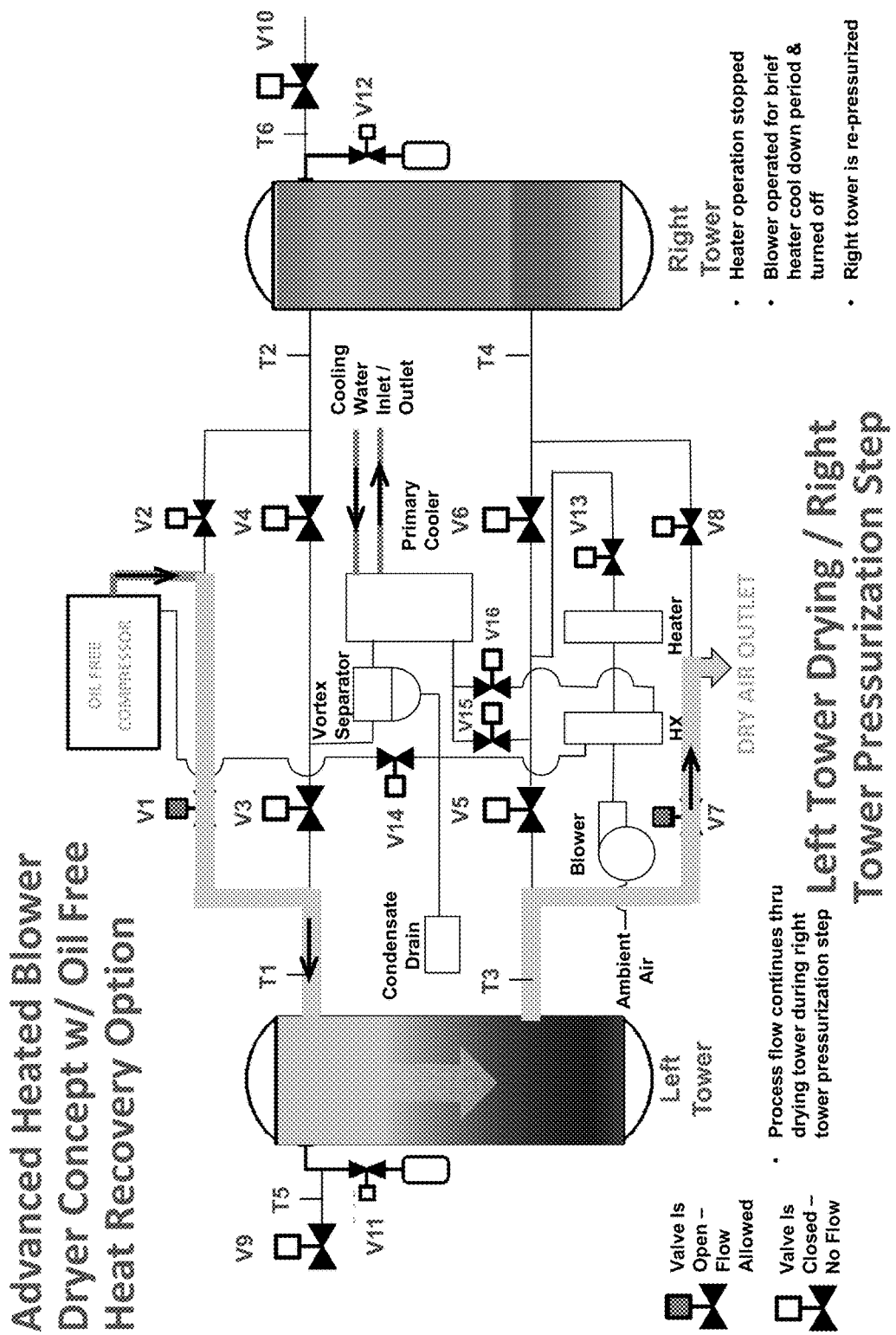
FIG. 4 illustrates yet another mode of operation of the embodiment depicted in FIG. 1.
Figure 5:
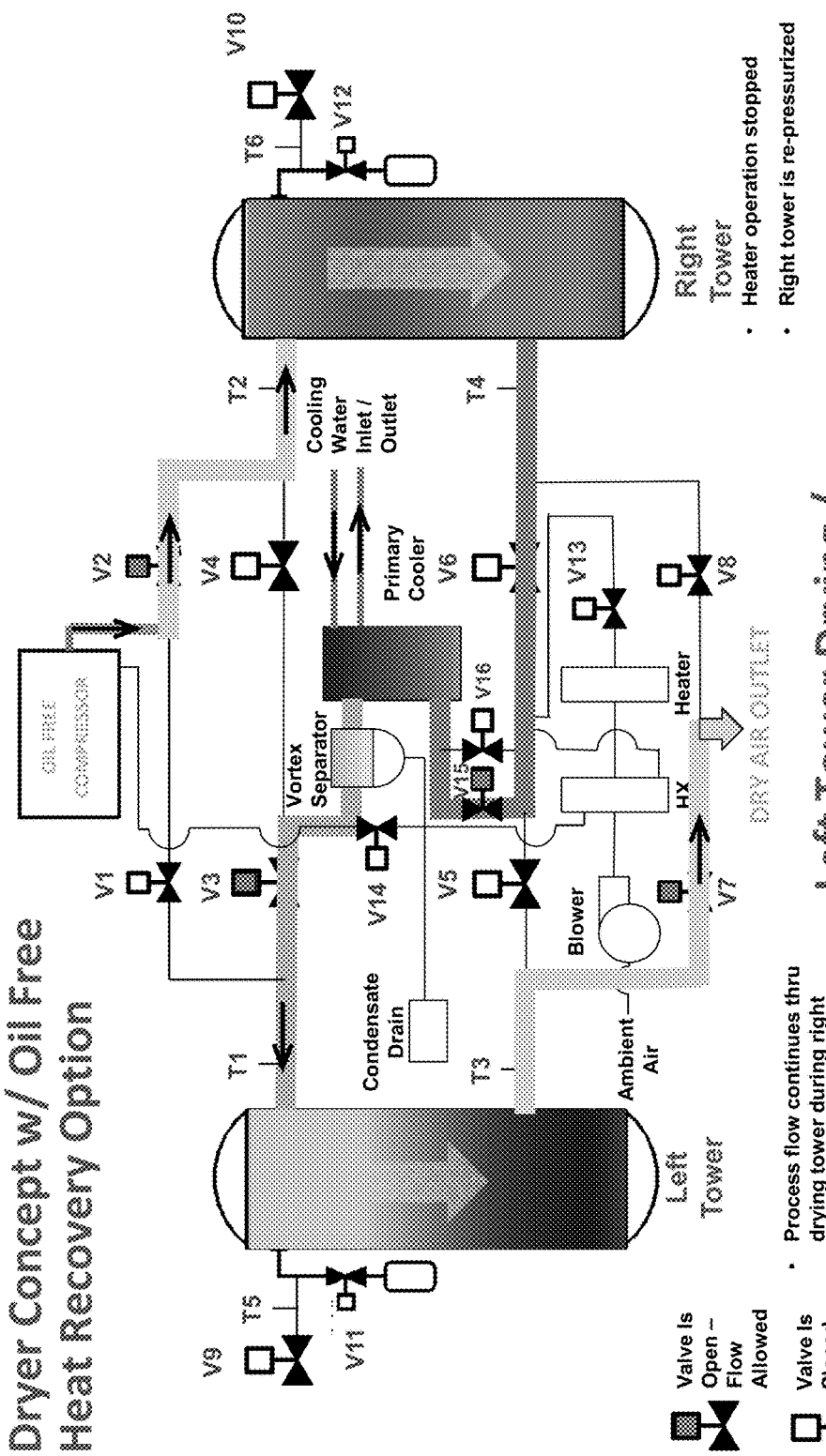
FIG. 5 illustrates still another mode of operation of the embodiment depicted in FIG. 1.
Figure 6:
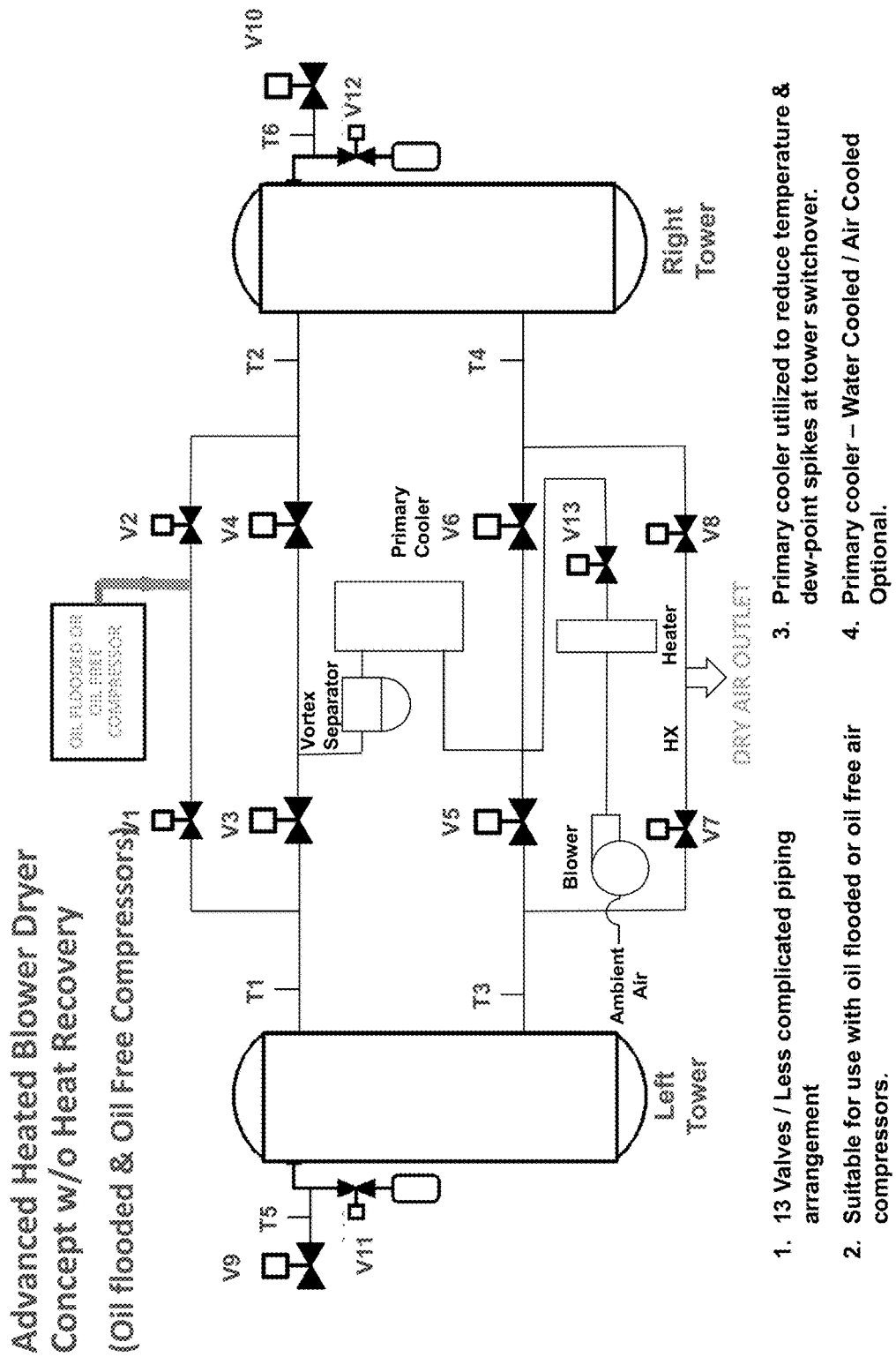
FIG. 6 illustrates components in one embodiment of a tower dryer system.
Figure 7:
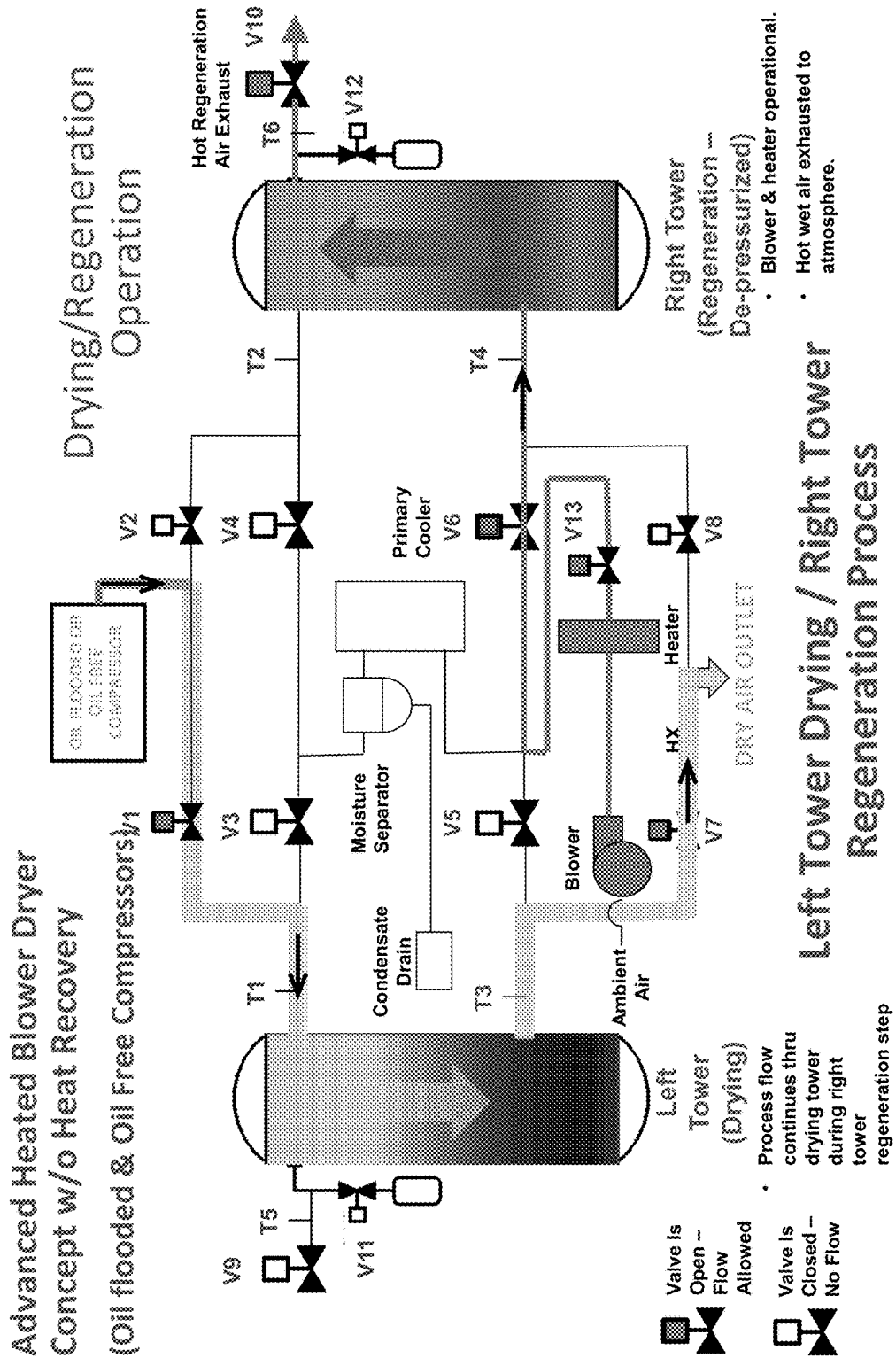
FIG. 7 illustrates one mode of operation of the embodiment depicted in FIG. 7.
Figure 8:
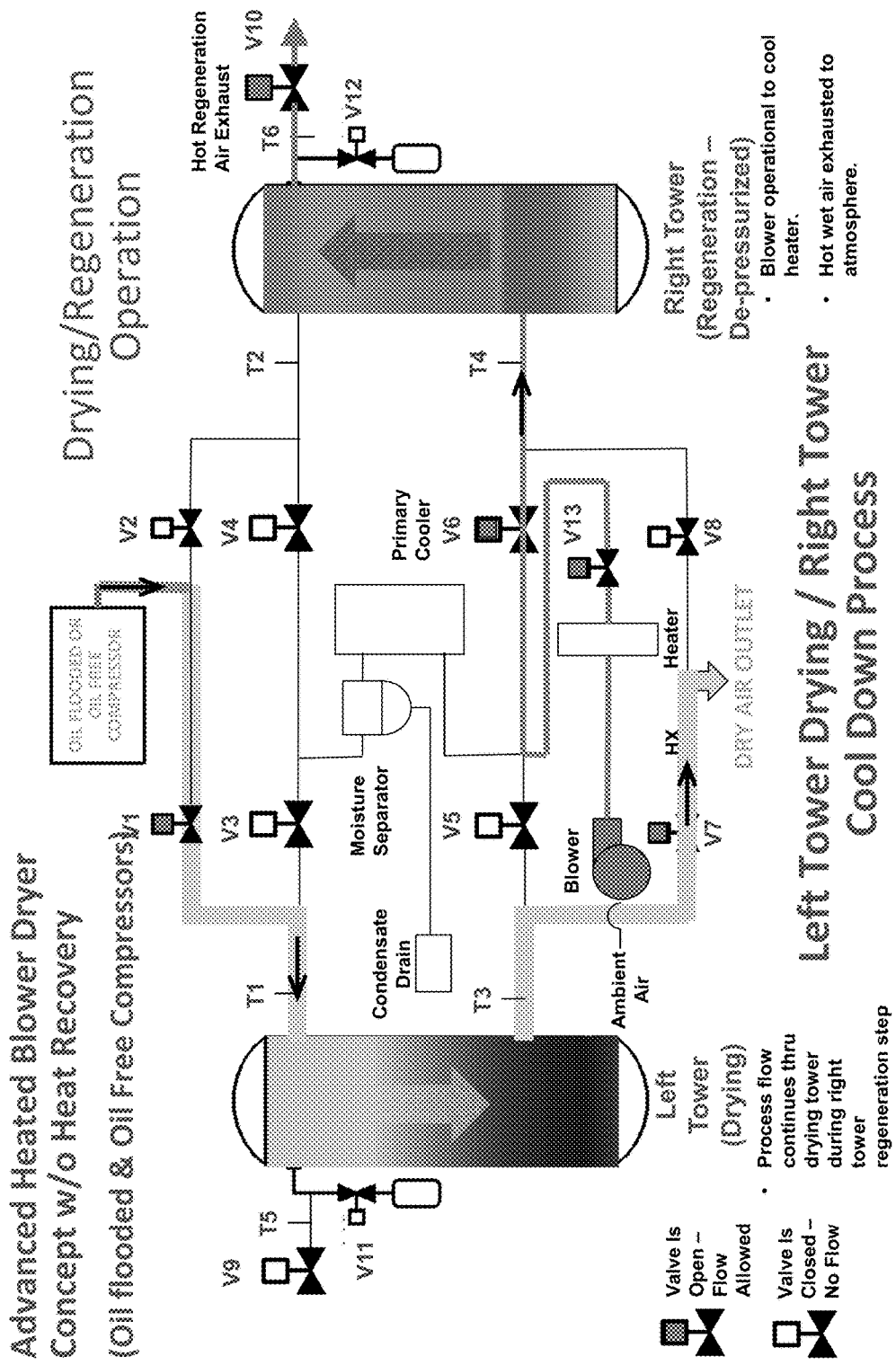
FIG. 8 illustrates another mode of operation of the embodiment depicted in FIG. 7.
Figure 9:
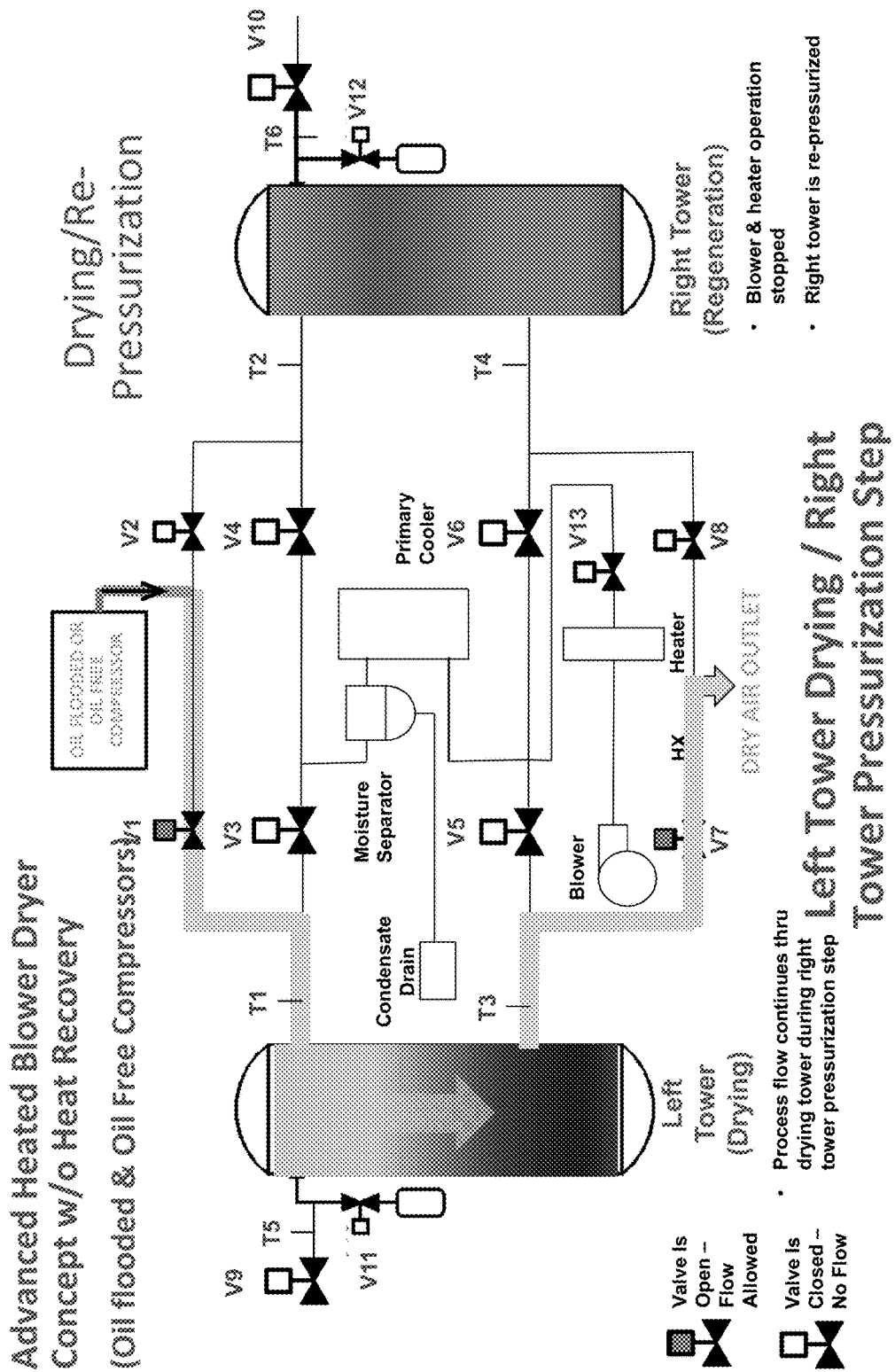
FIG. 9 illustrates yet another mode of operation of the embodiment depicted in FIG. 7.
Figure 10:
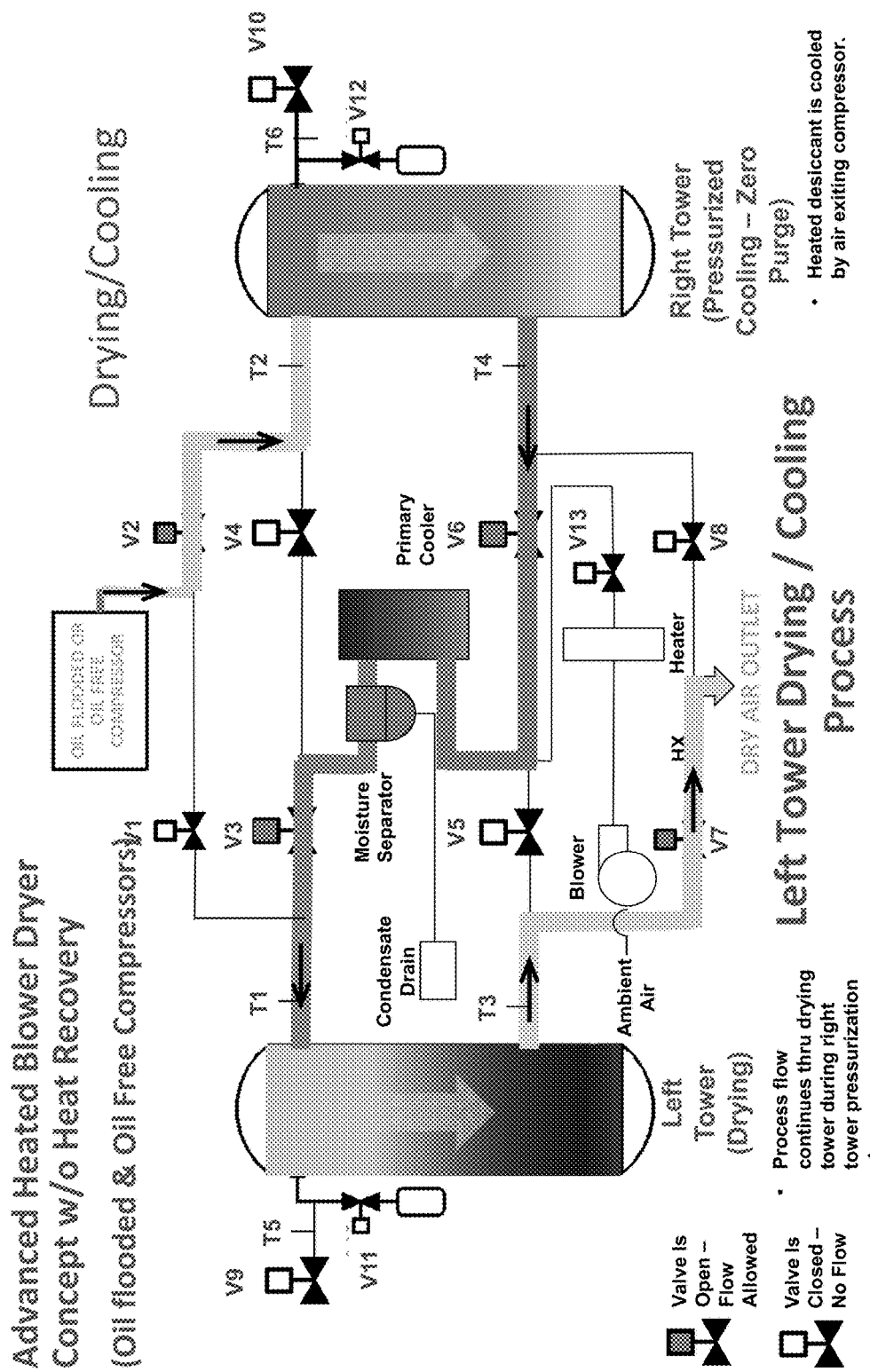
FIG. 10 illustrates still another mode of operation of the embodiment depicted in FIG. 7.

FIGS. 1-10 illustrate various embodiments of the present application and which are in various stages of use. Shown in the illustrated embodiments are compressed air drying tower systems useful to remove moisture from a compressed air stream provided by a compressor. The drying tower systems illustrated in the figures include pressure vessels (right tower, left tower) filled with a solid adsorbent desiccant material (in bead form in one embodiment), an air to liquid heat exchanger & separator, a series of actuated valves (V1, V2, ... ) employed to direct flow to the appropriate path within the dryer, and a control system comprised of a controller, temperature sensing devices (T1, T2, ... ), and an optional outlet dew-point monitor.

When operated a twin tower desiccant system can include two simultaneous processes; one tower/bed is designated for drying saturated compressed air and the other bed is designated for regeneration. The controller will open and close a series of valves within the group/network of valves present in the system to maintain the proper flow path through the dryer. The purpose of the dryer is to remove moisture from a stream of saturated compressed air which is supplied by an air compressor. When appropriate (e.g. when one tower has reached a threshold moisture capacity) the controller will actuate the valves to permit the inlet air to be switched from one tower to the other to facilitate a continuous drying process, at which point the original tower can be regenerated.

The drying process occurs as compressed air is directed through the tower that is designated for drying. The desiccant material (or other suitable drying element) will adsorb moisture as pressurized, saturated air passes through the drying tower based on air consumed through a point of use at the exit of the dryer. As saturated compressed air is forced through the drying tower, the desiccant material will reach a saturation point over a period of time (which can but need not be defined) and then require a regeneration process to liberate the moisture that was adsorbed during the drying cycle. At the end of this cycle, the controller will actuate a series of valves to redirect the compressed air to the other tower which has undergone a regeneration step.

The regeneration step is typically a multi-step process wherein the controller will (1) actuate a series of valves to isolate the tower undergoing regeneration, (2) actuate a de-pressurization valve to de-pressurize the tower, (3) initiate heating sequence—comprised of (a) activating a blower (or other suitable air moving device) that draws in ambient air and directs the air across an immersion heater (or any other suitable heater) to heat the air to an appropriate temperature (e.g. a minimum of 350 F in one embodiment of the application), (c) the heated air is then directed over the moist desiccant bed to liberate the adsorbed moisture, and (d) the moist air is exhausted to the atmosphere through a purge exhaust valve. The heating sequence will occur for either a definitive time period or terminate the cycle based on a sensor that correlates to/approximates/represents/etc a temperature of the regenerating tower (in one form this sensor is a temperature sensor that monitors the temperature of the air exiting the regenerating tower), and (4) initiate a multi-step cool down sequence wherein (a) the heater would be de-energized and (b) blower would operate for a fixed time period to cool the immersion heater for a brief period of time and in some embodiments also cool the regenerating tower for some period of time.

The instant application can also include re-pressurizing the regenerated tower in one form and then utilize a pressurized cooling cycle using compressed air from the compressor. The pressurized cooling cycle can reduce the temperature of the desiccant prior to activating the drying step of the tower that had just been regenerated.

Shown in the figures are two non-limiting embodiments of the instant application: (1) blower purge dryer that incorporates an internal cooling device in the form of either an air to water or air to air heat exchanger with a moisture separator for use with an oil flooded or oil free gas compressor or (2) an enhanced blower purge desiccant dryer containing the same components as defined by version (1) that would also contain an additional air to air heat exchanger to recover the heat from an oil free compressor. In some embodiments an oil free compressor uses additional controls & piping to mate with enhanced dryer design than that used for an oil flooded compressor. The second embodiment can incorporate a secondary heat exchanger to recover the heat rejected from an oil free compressor and use it to pre-heat the air entering the immersion heater.

In one form the dryer with integral cooler would operate as follows: (a) saturated compressed air exiting an-oil flooded or oil free compressor would enter the drying tower through valve V1, (b) the moisture from the saturated airstream would be adsorbed by the dryer (e.g. a desiccant) after which the compressed airstream exits the vessel, and (c) exit the dryer through valve V7 to a point of use location. On the regeneration side, the right tower would (a) depressurize the air contained within the vessel to atmosphere through valve V12 for a brief period and then the main exhaust valve V10 is opened, (b) energize valves V6 & V13 to permit regeneration flow, and (c) initiate the blower and heater activation sequence to regenerate the dryer (e.g. the desiccant). The other valves would remain closed during this period. At the conclusion of the regeneration step (the drying tower can remain active during this period), the blower can continue to operate for a brief period of time to cool the immersion heater. The regeneration heating sequence can be terminated either based on the outlet temperature measured at the top (outlet air side) of the vessel or based on time or compressor load condition as determined by the controller (or as described above).

The controller would then execute the right tower cooling sequence: (1) valves 13, 10 & 6 would close thereby pressurizing the right tower, (2) inlet air would be diverted to valve V2 to enter the right tower which has been regenerated and is at a very high temperature, (3) the inlet air from the compressor is now being used to cool the heated desiccant in the right tower and will be carried out of the right tower where it would be directed through valve V6, (4) the hot air is now directed to enter the cooler/separator combination wherein it would be significantly cooled prior to entering the left tower which has been designated for drying and (5) enter the drying tower where the moisture laden air would be removed by the desiccant and exit the dryer through valve V7. In this sequence, valves 2, 6, 3, & 7 (and 15 in those embodiments) are open and the others are closed during this step. The purpose of this cooler is to extract the heat exiting the right tower which has been recently regenerated and to further cool the compressed airstream prior to entering the drying tower. Reducing the temperature of the air entering the left drying tower helps to reduce the load on the tower thereby reducing the moisture load that enters the drying tower. The cooling cycle can be terminated based on a compressor load/unload signal (controller would determine compressor load percentage), temperature measurement (or a correlation/approximate/relation to temperature, such as a temperature measured at the outlet of the tower (bottom)), or completion of a time based setting.

At the completion of this step, the left tower designated for drying will now undergo the regeneration step and the right tower which had been regenerated and cooled will now be designated for drying. The regeneration step can occur for the left tower as described above for the right tower, with appropriate substitutions for the appropriate valve actuations. With the right tower being designated for drying, the controller can actuate the flow valves to permit compressed airflow through valve V2 to direct the process flow into the top of the right tower where the air will be dried and exit the dryer via valve V8. The controller will actuate a series of valves to permit for regeneration of the left tower through the following sequence: (1) valves V1, V3, V4, V6, and V7 will remain closed, (2) left tower purge valve V11 opens to de-pressurize the left tower for a brief period through a muffler and the left tower exhaust valve V9 opens afterwards, (3) valves V13 and V5 will open to permit regeneration flow through the left tower, (4) the blower and heater are energized to direct regeneration flow into the left tower through valves V13 and V5, and (5) the air is exhausted through valve V9.

At the completion of the regeneration step, the controller will execute the non-pressurized cooling sequence for the left tower comprised of: (1) valves 13, 9, & 5 would close thereby pressurizing the left tower, (2) inlet air would be diverted to valve V1 to enter the left tower which has been regenerated and is at a very high temperature, (3) the inlet air from the compressor is now being used to cool the heated desiccant in the left tower and will be carried out of the left tower where it would be directed through valve V5, (4) the hot air is now directed to enter the cooler/separator combination wherein it would be significantly cooled, pass through valve V4 prior to entering the right tower which has been designated for drying and (5) enter the drying tower where the moisture laden air would be removed by the desiccant and exit the dryer through valve V8. In this sequence, valves 1, 5, 4, & 8 (and 15 in those embodiments)

are open and the others are closed during this step. The purpose of this cooler is to extract the heat exiting the left tower which has been recently regenerated and to further cool the compressed airstream prior to entering the right drying tower. Reducing the temperature of the air entering the right drying tower helps to reduce the load on the tower thereby reducing the moisture load that enters the drying tower. The cooling cycle will either be terminated based on a compressor load/unload signal (controller would determine compressor load percentage), temperature measurement (or a correlation/approximate/relation to temperature, such as a temperature measured at the outlet of the tower (bottom), or completion of a time based setting.

Additional performance benefits are achieved when the integral cooler is designed with a high thermal effectiveness (i.e. high cooler temperature difference—CTD) to further reduce the load on the drying tower and to yield enhanced drying performance.

The flow path for drying and cooling can be directed downwards from the top of the vessel (considered as the inlet point for the compressed airstream) to the bottom of the vessel (considered as the outlet point for the compressed airstream).

The second version of this design incorporates a second heat exchanger to recover heat from an oil free compressor. A portion of the air leaving the last stage of an oil free compressor is used to pre-heat the air being discharged from the ambient blower during the regeneration phase.

In the first example where the right tower is being regenerated, the dryer controller will de-pressurize the right tower by opening valve V12 for a brief time period, open right tower exhaust valve, valve V10 and then close valve V12. After this, the controller will activate the pre-heating circuit by open valves V14, V16, and V3, The other valves utilized in the regeneration process described above will also be activated by the controller to permit regeneration flow through the right tower. This includes opening valves V13 and V6. After this, the controller will activated the blower and primary heater in a sequential format. Opening valve V14 will permit a portion of the hot air leaving the air compressor to enter the second heat exchanger valve V16. As the hot air enters the heat exchanger, the ambient air exiting the blower is simultaneously heated prior to entering the primary heater. The compressed air exiting the heat exchanger will then pass through valve V16, enter the primary cooler, the moisture separator, and exit valve V3 to mix with the cooled compressed discharge air that is flowing through the left tower inlet valve V1. The mixed air will enter the left drying tower and the moisture contained by the compressed airstream will be removed by the desiccant bed prior to exiting the dryer through valve V7.

The flow of compressed air through valve V14 could also be modulated to ensure proper heat transfer and to maximize heat recovery of the hot compressed discharge air.

When the left tower is undergoing regeneration, the second cooler will also be activated to pre-heat the air entering the heater and the controller will follow a similar valve sequence to (1) de-pressurize the left tower, (2) open the valves required for regenerating the left tower, and the blower & heater combination.

The dryer controller will sequence the valves to ensure that the process and regeneration flow paths are properly maintained. The controller will rely upon appropriate sensors (e.g. temperature sensors) that are located at the inlet and outlet of each vessel to determine the proper operating sequence for the dryer and to monitor the load condition of the compressor which can be used to extend or shorten the various operating sequences of the dryer in order to balance the capacity of the desiccant with the incoming moisture load of air being delivered from the compressor to the dryer. An additional enhancement can be achieved through the use of controlling the sequence using a dew-point monitor in conjunction with the load/unload control to minimize temperature and dew-point spikes associated with lower load conditions and to further optimize system operation. The use of a dew-point to control the operation is known by those skilled in the art.

The moisture separator can also be provided with either a primary condensate drain in the form of either a pneumatic or electronic non-air loss drain that is provided with a backup to avoid condensate buildup in the event of a primary drain failure.

The instant application can also enable the operation of a backup heatless mode but would require the addition of an orifice and control valve in the event of a problem with a heater or blower.

As described above, the controller is provided to monitor sensors and control valve, heater, and blower operation/actuation. The controller can be comprised of digital circuitry, analog circuitry, or a hybrid combination of both of these types. Also, the controller can be programmable, an integrated state machine, or a hybrid combination thereof. The controller can include one or more Arithmetic Logic Units (ALUs), Central Processing Units (CPUs), memories, limiters, conditioners, filters, format converters, or the like which are not shown to preserve clarity. In one form, the controller is of a programmable variety that executes algorithms and processes data in accordance with operating logic that is defined by programming instructions (such as software or firmware). Alternatively or additionally, operating logic for the controller can be at least partially defined by hardwired logic or other hardware. In one particular form, the controller is configured to operate as a Full Authority Digital Engine Control (FADEC); however, in other embodiments it may be organized/configured in a different manner as would occur to those skilled in the art.

The signal (such as a temperature signal) mentioned above can take the form of a voltage, current, optical, etc. The signal can be correlated, associated with, or otherwise generally indicative of a temperature of the dryer which indicates the dryer's relative capacity to dry an air stream. In one form the signal can be a measured temperature of a casing, flow stream, coupling, etc. The compressed air driven cool down event can be initiated and terminated based on any variety of control schemes, whether those schemes follow as a consequence of other controller operations, whether those schemes are time and/or temperature based, etc. The cool down event can be time based in some embodiments whether that is a fixed time or a variable time, but other embodiments can be based upon a temperature signal representative of desirable conditions being satisfied within the system. In still other forms the cool down event can be based on a combination of time, temperature, any other suitable indication of system capabilities/demands/etc.

The valves mentioned above can be any suitable type that can be manipulated to open and close fluid passageways. The valves can be actuated using any variety of techniques including electrically, hydraulically, pneumatically, etc. In addition, the valves can provide any number of inlets and outlets, such as one-way, two-way, three-way, etc valves.

The valves can be grouped forming a network that operate in conjunction with signals provided from the controller. In one form the network can be actuated such that one or more of the valves in the network are opened while the other of the valves are closed. In this manner the valves can be operated in concert to selectively open and close various pathways permitting fluid such as air to move from one portion of the system to the other. Given the number of potential pathways the valves can be selectively opened and closed to form any number of pathways for the conveyance of fluid.

One aspect of the present application provides an apparatus comprising a multi-tower regenerative dryer system having first drying tower and a second drying tower and structured to remove moisture from a compressed air stream provided through an intake passage from a compressor, a controller configured to selectively place the first drying tower, second drying tower, and intake passage in fluid communication with each other during a regeneration cycle to conduct a cooling flow period in response to a signal associated with a temperature of the first drying tower, the controller structured to configure the multi-tower regenerative dryer system to: route the compressed air stream from the intake passage to the first drying tower to cool down a drying element of the first drying tower as a result of the drying element having been heated during regeneration thereby creating a first tower outlet air stream, and convey the first tower outlet air stream from the first drying tower to the second drying tower to absorb moisture in the first tower outlet air stream that has traversed from the intake passage to the first drying tower and then to the second drying tower.

One feature of the present application further includes a cooler situated in fluid communication between the first drying tower and the second drying tower and structured to cool the first tower outlet air stream prior to being received by the second drying tower.

Another feature of the present application further includes a purge blower in selective fluid communication with the first drying tower, and a heater structured to heat a stream of air that flows through action of the purge blower such that heated air can be provided to the first drying tower when the purge blower is placed in fluid communication with the first drying tower.

Yet another feature of the present application further includes a pre-heater structured to heat the stream of air provided from action of the purge blower prior to the stream of air being heated by the heater.

Still another feature of the present application provides a valve system having a plurality of valves actuatable from the controller and configured to place the first drying tower in selective fluid communication with the intake passage and the first drying tower in selective communication with the purge blower.

Still yet another feature of the present application provides wherein the controller is further structured to configure the multi-tower regenerative dryer system to maintain the heater in an off condition while the purge blower provides air to the first drying tower during a preliminary cool down event, wherein the valve system isolates the first drying tower from the intake passage, and wherein the valve system permits discharge of the air provided from the purge blower from the first drying tower.

A further feature of the present application provides wherein the controller is further structured to configure the multi-tower regenerative dryer system to: route the compressed air stream from the intake passage to the second drying tower to cool down a drying element of the second drying tower as a result of the drying element having been heated during regeneration thereby creating a second tower outlet air stream, and convey the second tower outlet air stream from the second drying tower to the first drying tower to absorb moisture in the second tower outlet air stream that has traversed from the intake passage to the second drying tower and then to the first drying tower.

Another aspect of the present application provides an apparatus comprising a twin tower heated purge blower dryer system having an intake conduit structured to receive compressed air from a compressor, a first drying tower with drying element, a second drying tower with drying element, a purge blower heater structured to provide heat to the first drying tower and second drying tower, an actuatable valve network structured to selectively open and close a plurality of fluid pathways; and a controller structured to: de-energize the purge blower heater after a heating event of the first drying tower used to dry the tower, command a plurality of valves of a valve network to initiate a cooling event to reduce temperature of the first drying tower, the valve network configured as a result of the command to place the intake conduit in serial communication with the first drying tower and second drying tower, where the first drying tower is fluidically between the intake conduit and the second drying tower.

One feature of the present application provides wherein the controller is further structured to command the plurality of valves in the valve network to initiate operation in which the second drying tower is fluidically isolated from the intake conduit, the first drying tower is in fluid communication with the intake conduit to dry the compressed air, and the second drying tower is in fluid communication with the purge blower heater to regenerate the second drying tower, wherein the purge blower heater is energized such that heated air is conveyed from the purge blower heater to the second drying tower.

Another feature of the present application provides wherein the controller is further structured to de-energize the purge blower heater after a heating event of the second drying tower used to dry the tower, and command the plurality of valves of the valve network to initiate a cooling event to reduce temperature of the second drying tower, the valve network configured as a result of the command to place the intake conduit in serial communication with the second drying tower and first drying tower, where the second drying tower is fluidically between the intake conduit and the first drying tower.

Still another feature of the present application provides wherein the controller is further structured to provide purge air from the purge blower heater in which a heater of the purge blower heater is not activated such that relatively cool air is provided from the purge blower heater, the relatively cool air from the purge blower heater routed to the first drying tower after the purge blower heater has provided heated air to the first drying tower and before the first drying tower is placed in fluidic communication between the intake conduit and the second drying tower to cool the first drying tower.

Still yet another feature of the present application further includes a cooler disposed between the first drying tower and the second drying tower and structured to cool a fluid flowing from the first drying tower to the second drying tower when the plurality of valves of the valve network are configured to place the first drying tower fluidically between the intake conduit and the second drying tower.

A further feature of the present application provides wherein the controller is further configured to command the plurality of valves to close off flow paths and thereby cease flow from the first drying tower to the second drying tower as a result of a cool down of the first drying tower.

A yet further feature of the present application further includes a moisture separator downstream of the cooler and upstream of the second drying tower.

Still another aspect of the present application provides a method comprising upon completion of a regenerative heating process, ceasing a heating of a first dryer of a multi-tower compressed air dryer, while the heating of the first dryer is ceased, routing compressed air from an intake conduit to the first dryer to cool the first dryer during a cooling process, and during the cooling process and after the routing, conveying the compressed air from the first dryer to a second dryer of the multi-tower compressed air dryer.

One feature of the present application further includes cooling the compressed air when it is being conveyed from the first dryer to the second dryer.

Another feature of the present application provides wherein a heating includes generating a flow stream with a blower and elevating the temperature of the flow stream with a heater.

Still another feature of the present application provides wherein during the regenerative heating process, pre-heating the flow stream at a location upstream of the heater with a heat exchanger structured to provide heat to the flow stream from an offtake flow of the compressed air.

Still yet another feature of the present application further includes cooling the offtake flow using a cooler prior to merging the offtake flow.

A further feature of the present application provides upon completion of a regenerative heating process and prior to the routing, pre-cooling the first dryer.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus comprising:
a multi-tower regenerative dryer system having a first drying tower and a second drying tower and structured to remove moisture from a compressed air stream provided through an intake passage from a compressor;
a controller configured to selectively place the first drying tower, second drying tower, and intake passage in fluid communication with each other during a regeneration cycle to conduct a cooling flow period in response to a signal associated with a temperature of the first drying tower, the controller structured to configure the multi-tower regenerative dryer system to:
route the compressed air stream from the intake passage to the first drying tower to cool down a drying element of the first drying tower as a result of the drying element having been heated during regeneration thereby creating a first tower outlet air stream; and
convey the first tower outlet air stream from the first drying tower to the second drying tower to absorb moisture in the first tower outlet air stream that has traversed from the intake passage to the first drying tower and then to the second drying tower.

2. The apparatus of claim 1, which further includes a cooler situated in fluid communication between the first drying tower and the second drying tower and structured to cool the first tower outlet air stream prior to being received by the second drying tower.

3. The apparatus of claim 2, which further includes a purge blower in selective fluid communication with the first drying tower, and a heater structured to heat a stream of air that flows through action of the purge blower such that heated air can be provided to the first drying tower when the purge blower is placed in fluid communication with the first drying tower.

4. The apparatus of claim 3, which further includes a pre-heater structured to heat the stream of air provided from action of the purge blower prior to the stream of air being heated by the heater.

5. The apparatus of claim 3, which further includes a valve system having a plurality of valves actuatable from the controller and configured to place the first drying tower in selective fluid communication with the intake passage and the first drying tower in selective communication with the purge blower.

6. The apparatus of claim 5, wherein the controller is further structured to configure the multi-tower regenerative dryer system to maintain the heater in an off condition while the purge blower provides air to the first drying tower during a preliminary cool down event, wherein the valve system isolates the first drying tower from the intake passage, and wherein the valve system permits discharge of the air provided from the purge blower from the first drying tower.

7. The apparatus of claim 1, wherein the controller is further structured to configure the multi-tower regenerative dryer system to:
route the compressed air stream from the intake passage to the second drying tower to cool down a drying element of the second drying tower as a result of the drying element having been heated during regeneration thereby creating a second tower outlet air stream; and
convey the second tower outlet air stream from the second drying tower to the first drying tower to absorb moisture in the second tower outlet air stream that has traversed from the intake passage to the second drying tower and then to the first drying tower.

8. An apparatus comprising:
a twin tower heated purge blower dryer system having an intake conduit structured to receive compressed air from a compressor, a first drying tower with drying element, a second drying tower with drying element, a purge blower heater structured to provide heat to the first drying tower and second drying tower, an actuatable valve network structured to selectively open and close a plurality of fluid pathways; and a controller structured to:
de-energize the purge blower heater after a heating event of the first drying tower used to dry the tower such that ambient air provided by a purge blower is used to cool down the first drying tower during a preliminary cool down event; and command a plurality of valves of a valve network to initiate a cooling event to reduce temperature of the first drying tower, the valve network configured as a result of the command to place the intake conduit in serial communication with the first drying tower and second drying tower, where the first drying tower is fluidically between the intake conduit and the second drying tower.

9. The apparatus of claim 8, wherein the controller is further structured to command the plurality of valves in the valve network to initiate operation in which the second drying tower is fluidically isolated from the intake conduit, the first drying tower is in fluid communication with the intake conduit to dry the compressed air, and the second drying tower is in fluid communication with the purge blower heater to regenerate the second drying tower, wherein the purge blower heater is energized such that heated air is conveyed from the purge blower heater to the second drying tower.

10. The apparatus of claim 9, wherein the controller is further structured to:
de-energize the purge blower heater after a heating event of the second drying tower used to dry the tower; and
command the plurality of valves of the valve network to initiate a cooling event to reduce temperature of the second drying tower, the valve network configured as a result of the command to place the intake conduit in serial communication with the second drying tower and first drying tower, where the second drying tower is fluidically between the intake conduit and the first drying tower.

11. The apparatus of claim 10, wherein the controller is further structured to provide purge air from the purge blower heater in which a heater of the purge blower heater is not activated such that relatively cool air is provided from the purge blower heater, the relatively cool air from the purge blower heater routed to the first drying tower after the purge blower heater has provided heated air to the first drying tower and before the first drying tower is placed in fluidic communication between the intake conduit and the second drying tower to cool the first drying tower.

12. The apparatus of claim 8, which further includes a cooler disposed between the first drying tower and the second drying tower and structured to cool a fluid flowing from the first drying tower to the second drying tower when the plurality of valves of the valve network are configured to place the first drying tower fluidically between the intake conduit and the second drying tower.

13. The apparatus of claim 12, wherein the controller is further configured to command the plurality of valves to close off flow paths and thereby cease flow from the first drying tower to the second drying tower as a result of a cool down of the first drying tower.

14. The apparatus of claim 12, which further includes a moisture separator downstream of the cooler and upstream of the second drying tower.

15. A method comprising:
upon completion of a regenerative heating process, ceasing a heating of a first dryer of a multi-tower compressed air dryer;
while the heating of the first dryer is ceased, operating a purge blower to blow ambient air as a cooling fluid to the first drying tower during a preliminary cool down event of the first drying tower,
after operating the purge blower, routing compressed air from an intake conduit to the first dryer to cool the first dryer during a cooling process; and
during the cooling process and after the routing, conveying the compressed air from the first dryer to a second dryer of the multi-tower compressed air dryer.

16. The method of claim 15, which further includes cooling the compressed air when it is being conveyed from the first dryer to the second dryer.

17. The method of claim 15, wherein the heating includes generating a flow stream with a blower and elevating the temperature of the flow stream with a heater.

18. The method of claim 15, wherein during the regenerative heating process, pre-heating the flow stream at a location upstream of the heater with a heat exchanger structured to provide heat to the flow stream from an offtake flow of the compressed air.

19. The method of claim 18, which further includes cooling the offtake flow using a cooler prior to merging the offtake flow.

20. The method of claim 15, upon completion of a regenerative heating process and prior to the routing, pre-cooling the first dryer.

* * * * *